(12) United States Patent
Malladi et al.

(10) Patent No.: US 10,372,606 B2
(45) Date of Patent: Aug. 6, 2019

(54) SYSTEM AND METHOD FOR INTEGRATING OVERPROVISIONED MEMORY DEVICES

(71) Applicant: Samsung Electronics Co., Ltd., Suwon-si, Gyeonggi-do (KR)

(72) Inventors: Krishna Malladi, San Jose, CA (US); Jongmin Gim, San Jose, CA (US); Hongzhong Zheng, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 161 days.

(21) Appl. No.: 15/282,848

(22) Filed: Sep. 30, 2016

(65) Prior Publication Data
US 2018/0032260 A1   Feb. 1, 2018

Related U.S. Application Data

(60) Provisional application No. 62/368,775, filed on Jul. 29, 2016.

(51) Int. Cl.
*G06F 12/08* (2016.01)
*G06F 12/0868* (2016.01)
*G06F 12/10* (2016.01)

(52) U.S. Cl.
CPC .......... *G06F 12/08* (2013.01); *G06F 12/0868* (2013.01); *G06F 12/10* (2013.01); *G06F 2212/1016* (2013.01); *G06F 2212/152* (2013.01); *G06F 2212/401* (2013.01); *G06F 2212/403* (2013.01)

(58) Field of Classification Search
USPC ....................................... 711/170
See application file for complete search history.

(56) References Cited

U.S. PATENT DOCUMENTS

| | | |
|---|---|---|
| 6,438,560 B1 | 8/2002 | Loen |
| 7,650,460 B2 | 1/2010 | Cheriton |
| 8,065,476 B2 | 11/2011 | Cheriton |
| 8,230,168 B2 | 7/2012 | Cheriton |
| 8,504,791 B2 | 8/2013 | Cheriton |
| 8,612,673 B2 | 12/2013 | Cheriton |
| 8,832,531 B2 | 9/2014 | Shalvi et al. |

(Continued)

OTHER PUBLICATIONS

John Peter Stevenson, "Fine-Grain In-Memory Deduplication for Large-Scale Workloads," a dissertation submitted tot eh Department of Electrical Engineering and the Committee on Graduate Studies of Stanford University, Dec. 2013, 140 pages.

(Continued)

*Primary Examiner* — Mardochee Chery
(74) *Attorney, Agent, or Firm* — Innovation Counsel LLP

(57) ABSTRACT

A memory device includes a memory interface to a host computer and a memory overprovisioning logic configured to provide a virtual memory capacity to a host operating system (OS). A kernel driver module of the host OS is configured to manage the virtual memory capacity of the memory device provided by the memory overprovisioning logic of the memory device and provide a fast swap of anonymous pages to a frontswap space and file pages to a cleancache space of the memory device based on the virtual memory capacity of the memory device.

17 Claims, 6 Drawing Sheets

(56) References Cited

U.S. PATENT DOCUMENTS

| | | | |
|---|---|---|---|
| 8,938,580 B2 | 1/2015 | Cheriton | |
| 9,021,203 B2 | 4/2015 | Hyde, II et al. | |
| 9,164,903 B2 | 10/2015 | Sarta | |
| 9,336,129 B2 | 5/2016 | Bennett et al. | |
| 9,501,421 B1 | 11/2016 | Cheriton | |
| 9,520,193 B2 | 12/2016 | Cheriton | |
| 2010/0161909 A1* | 6/2010 | Nation | G06F 9/5016 711/147 |
| 2012/0266165 A1* | 10/2012 | Cen | G06F 9/45541 718/1 |
| 2013/0275699 A1 | 10/2013 | Cheriton | |
| 2014/0208041 A1 | 7/2014 | Hyde et al. | |
| 2015/0006805 A1* | 1/2015 | Feekes | G06F 12/08 711/105 |
| 2015/0074339 A1 | 3/2015 | Cheriton | |
| 2015/0081649 A1 | 3/2015 | Kim et al. | |
| 2016/0077761 A1* | 3/2016 | Stabrawa | G06F 3/0604 711/172 |
| 2016/0077975 A1* | 3/2016 | Stabrawa | G06F 3/0604 711/209 |
| 2016/0291891 A1 | 10/2016 | Cheriton | |
| 2016/0378530 A1* | 12/2016 | Ramasubramanian | G06F 9/45558 718/1 |
| 2017/0109049 A1 | 4/2017 | Cheriton | |

OTHER PUBLICATIONS

Heiner Litz, et al., "Fine-Grain Memory Deduplication for In-Memory Database Systems," 22 pages.

Yoongu Kim, "HICAMP: Architectural Support for Efficient Concurrency-Safe Shared Structured Data Access," Cheriton et al., ASPLOS 2012, Nov. 18, 2013, 43 pages.

David Cheriton, et al., "HICAMP: Architectural Support for Efficient Concurrency-Safe Shared Structured Data Access," Hicamp Systems, Inc., pp. 287-299.

"A 3-Level Cache Miss Model for a Nonvolatile Extension to Transcendent Memory," IEEE 6th International Conference on Cloud Computing Technology and Science, 2014, pp. 1-8.

"Transcendent Memory and Linux," Proceedings of the Linux Symposium, Montreal, Quebec, Canada, Jul. 13-17, 2009, pp. 1-9.

* cited by examiner ns of the DRAM channel but also the performance benefits of the DRAM or other memory technologies that the system offers.

SYSTEM AND METHOD FOR INTEGRATING OVERPROVISIONED MEMORY DEVICES

CROSS-REFERENCE TO RELATED APPLICATION(S)

This application claims the benefits of and priority to U.S. Provisional Patent Application Ser. No. 62/368,775 filed Jul. 29, 2016, the disclosure of which is incorporated herein by reference in its entirety.

TECHNICAL FIELD

The present disclosure relates generally to memory systems, more particularly, to a system and method for integrating overprovisioned memory devices.

BACKGROUND

Typical modern computer applications such as databases, virtual desktop infrastructure, and data analytics require a large main memory. As computer systems scale to perform more complex data and storage intensive applications, the needs for larger memory capacity increase proportionally.

Data errors may occur due to various environmental factors affecting the reliability of DRAM cells. A large number of memory errors may be still correctible via employing error codes but need longer access latency. More retiring pages may result in the reduction of the effective memory capacity. Depending on the implementation, the reduced memory capacity caused by data errors may be regained after hardware reset.

While dynamic random access memory (DRAM) technology scales aggressively beyond 20 nm process technology to meet such increasing needs for memory capacity, system-level techniques such as inline compression or deduplication, and error-correction are applied to increase a virtual memory capacity of the system memory by as much as 2-3 times a physical memory capacity of the system memory.

Transcendent memory refers to a class of memory in the Linux kernel that is of unknown and dynamically variable size. The transcendent memory is addressable only indirectly by the Linux kernel, configured either as a persistent memory or as an ephemeral memory. The ephemeral memory indicates that the memory is temporarily available, but disappears without warning. The transcendent memory is still fast enough to be synchronously accessible.

A transcendent memory space is separated from the Linux kernel without enumeration by a memory management unit (MMU) as in some software-based implementations such as zswap. Zswap is a Linux kernel feature providing a compressed write-back cache for swapped pages. Instead of moving memory pages to a swap device such as a solid-state drive (SSD) or a hard disk drive (HDD) when the memory pages are to be swapped out, zswap performs the compression and stores the compressed cache into a memory pool that is dynamically allocated inside the system's memory.

A transcendent memory can provide a variable virtual memory capacity to a host computer over a DRAM channel. The variable virtual memory capacity of a transcendent memory can be exposed to the host computer as a system swap through a block input/output (I/O) layer of an OS kernel. A transcendent memory should be integrated into an existing system accounting for not only the latency require-

SUMMARY

According to one embodiment, a memory device includes a memory interface to a host computer and a memory overprovisioning logic configured to provide a virtual memory capacity to a host operating system (OS). A kernel driver module of the host OS is configured to manage the virtual memory capacity of the memory device provided by the memory overprovisioning logic of the memory device and provide a fast swap of the anonymous pages to a frontswap space and file pages to a cleancache space of the memory device based on the virtual memory capacity of the memory device.

According to another embodiment, a method includes: providing a memory device including a memory overprovisioning logic configured to provide a virtual memory capacity to a host operating system (OS); configuring the memory device as a block memory device over a memory interface to a host computer; loading a kernel driver module from a kernel of the host OS during a runtime; and providing a fast swap of the anonymous pages to a frontswap space and file pages to a cleancache space of the memory device using the kernel driver module based on the virtual memory capacity of the memory device.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
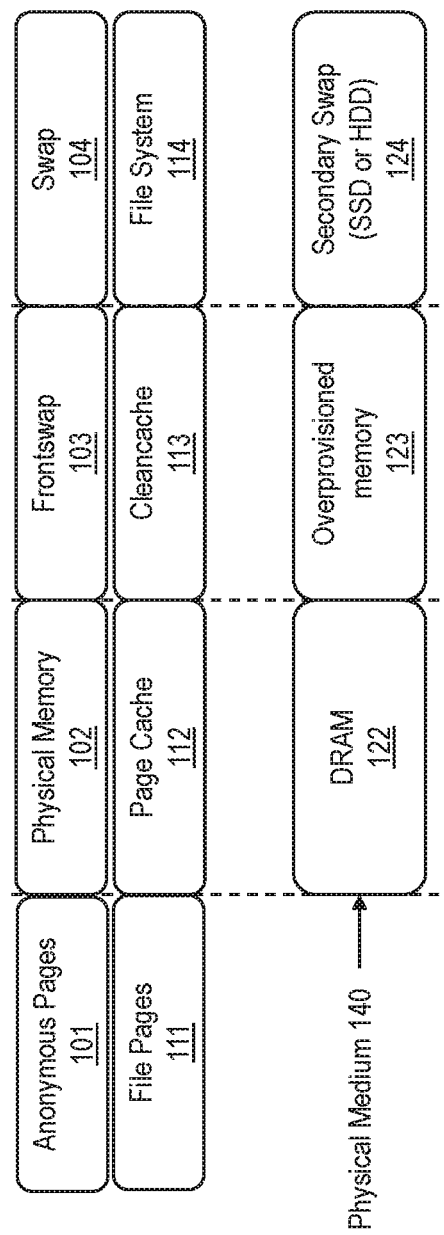
FIG. 1 shows an example memory hierarchy, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide efficient integration of overprovisioned memory systems. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes an overprovisioned memory device that can have a varying memory capacity. Data stored in the overprovisioned memory device can be inline compressed, deduplicated, and/or error-corrected. The present disclosure also describes simple and efficient methods of integrating an overprovisioned memory device into a system transparently to the software or applications, and managing an amplified memory capacity of the overprovisioned memory device resulting from data compression or deduplication, or error-correction. Moreover, the implementation and use of the overprovisioned capacity of the overprovisioned memory device is wrapped within a kernel driver module instead of a system kernel of a host computer.

In addition, the present disclosure provides an efficient method for deploying inline memory "Augmentation By Compression, Deduplication, or/and Error-correction." The present overprovisioned memory system may also be referred to as "memory ABCDE." A system deployed with the present overprovisioned memory device can dramatically increase the memory capacity while relying on techniques that are local to the present overprovisioned memory device.

There are several challenges to integrate the present overprovisioned memory device into an existing memory system. For example, a variable memory capacity of the present overprovisioned memory device can change with application data or external conditions that may affect errors, compaction ratios, and the like.

According to one embodiment, the present overprovisioned memory system can be a transcendent memory combined with a hardware implementation that provides a higher virtual capacity by data compression, data deduplication, and/or error-correction. The present overprovisioned memory can provide system-level support for a variable memory capacity without significant modifications to a memory management unit (MMU) of a host operating system (OS).

Without proper hardware implementations for providing data compression, data deduplication, and/or error-correction, integration of an overprovisioned memory device into an existing memory system may require significant modifications to the MMU of the host OS. For example, in case of a synchronous interface such as a double data rate (DDR) interface, a memory module with a varying memory capacity may not be able to conform to synchronous interface timings due to data compression/deduplication and/or error correction. On an asynchronous interface such as a peripheral component interconnect express (PCIe) interface, a memory system may suffer from a longer latency through a block-based I/O stack that may not be optimized for a fine-grained memory access to a memory module.

Moreover, the memory capacity, i.e., virtual memory capacity of the overprovisioned memory device that is advertised to a host system during a boot time can be as larger than its physical memory capacity. However, during a runtime, the resident applications or external conditions of the host system could be unfavorable to the data compression, deduplication, or/and error-correction that may occur in the memory module, resulting in a memory shortage.

A solution to deal with these issues would be to make extensive modifications to the kernel of the host system to allow the memory management unit (MMU) to be aware of the details of the data compression, deduplication, or/and error-correction, and allow the MMU to micromanage paging/swapping when necessary. However, such modifications would require significant changes to the MMU and the kernel of the host OS. The present overprovisioned memory device is implemented with a scalable kernel driver module such that no modification is made to the MMU of the kernel of the host OS.

The kernel driver module can dynamically adjust the virtual memory capacity of the present overprovisioned memory device with feedback received from the present overprovisioned memory device. The kernel driver module can eliminate the need for extensive modifications to the kernel system's memory management unit (MMU). The kernel driver module may be a part of the host OS. However, the kernel driver module may not be compiled as a part of the kernel of the host OS. Instead, the kernel driver module can be compiled separately from the kernel of the host OS and separately loaded from the kernel of the host OS, for example, during a runtime.

According to some embodiments, the present overprovisioned memory device can provide data compression, deduplication, or/and error-correction over various system interfaces. Examples of such system interfaces include, but are not limited to the DDR interface and the PCIe interface.

FIG. 1 shows an example memory hierarchy, according to one embodiment. The physical medium 140 includes a DRAM 122, an overprovisioned memory 123, and a secondary swap system 124 such as a solid-state drive (SSD) or a hard disk drive (HDD). The host OS allocates physical memory 102 of the DRAM 122 to various processes in the unit of pages. The memory management unit (MMU) of the host OS can map the physical pages to virtual memory as required by a particular process. Typically, a page is 4 KB of the physical memory 102. The MMU keeps statistics and flags for each page to determine the status of the allocated pages. Pages can be in different states; some are free (unused), some are used to hold executable code, and some are allocated to map data for an application program.

Pages can be stored in the system page cache 112 of the physical memory 102. Pages are largely categorized into anonymous pages 101 and non-anonymous file pages 111. Anonymous pages reside in the physical memory 102. However, the host OS kernel does not map anonymous pages to a physical address before they get written. As a consequence, anonymous pages do not add burden to the host OS kernel before they are actually used. This allows a process to "reserve" a lot of memory in the virtual memory address space without using the physical memory 102. The host OS kernel can reserve more memory than actually available. The anonymous pages 101 can be migrated to a frontswap space 103 of the overprovisioned memory 123 or a swap space 104 of the secondary swap system 124. The non-anonymous file pages 111 residing in the page cache 112 can be migrated to a cleancache 113 of the overprovisioned memory 123 or a file system 114 of the secondary swap system 124. The non-anonymous file pages 111 are clean and can be evicted from the system page cache 112 due to a shortage of the system's physical memory 102.

The MMU of the host OS provides memory address translation, memory management, memory protection, cache control, etc. via application programming interface (API) calls to the physical medium 140. According to one embodiment, frontswap and the cleancache APIs provide fast swap interfaces to the overprovisioned memory 123 via a kernel driver module. More specifically, the frontswap 103 provides a hook to intercept the anonymous pages 101 before they are migrated to the secondary swap system 124. The cleancache 113 provides a similar hook for the non-anonymous file pages 111. Therefore, the present overprovisioned memory 123 accessible by the frontswap and the cleancache APIs 103 and 113 via the kernel driver module can behave like a swap device but with a memory block access, instead of being cacheline-based as the secondary swap system 124. Typically, a block I/O layer of the host OS kernel can provide block-level page accesses to the secondary swap system 124. The kernel driver module's hooks to the frontswap and the cleancache API calls allow page accesses to the overprovisioned memory 123 without going through the block I/O layer.

Figure 2:
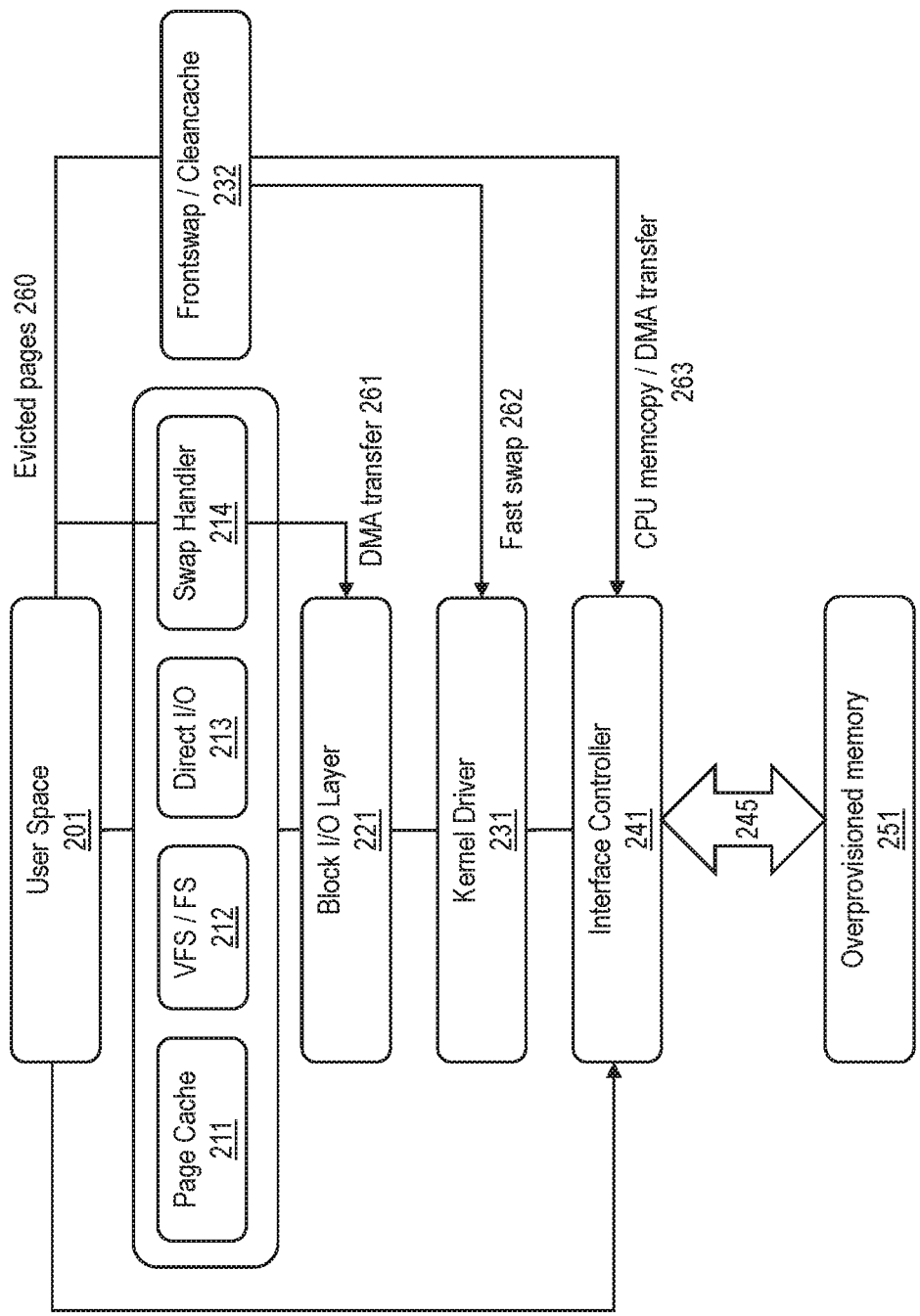
FIG. 2 shows a schematic diagram for provisioning an example overprovisioned memory device using frontswap and cleancache hooks, according to one embodiment.

FIG. 2 shows a schematic diagram for provisioning an example overprovisioned memory device using frontswap and cleancache hooks, according to one embodiment. A user space 201 refers to files and programs that are loaded by user space applications outside of the kernel of the host OS. Utilities, programming languages, and graphical tools are the examples of user space applications. A user application starts by loading files and programs of the user space 201 into the system memory to allow the user application to make API system calls into the kernel space of the host OS.

The system calls from the user space 201 are handed over to a host OS kernel including a page cache 211, a virtual file system (VFS) and/or a file system (FS) 212, a direct I/O 213, and a swap handler 214, and frontswap/cleancache API hooks 232. The VFS acts as an interface between the kernel and the different file systems. The VFS is a kernel layer that handles system calls related to a standard file system. The host OS can manage multiple file systems through the VFS. The VFS bridges the gap between different file systems and provides a common system call interface to the user space.

The block I/O layer 221 provides interfaces to the page cache 211, the VFS/FS 212, the direct I/O 213, and the swap handler 214 to access the physical system memory and a secondary swap system such as an SSD or a HDD. The swap handler 214 can also handle direct memory access (DMA) transfer 261 of evicted pages 260 to the block I/O layer 221.

According to one embodiment, the system provides a frontswap/cleancache API interface 232 to an overprovisioned memory device 251. Pages of the physical system memory can be fast swapped to the overprovisioned memory device 251 at a block level via the frontswap/cleancache API hooks 232. Accordingly, the overprovisioned memory device 251 can act like a swap device but with block accesses, instead of being accessed by the block I/O layer 221. The frontswap/cleancache API hooks 232 allow page accesses to the overprovisioned memory device 251 via an interface controller 241 over a specific device interface 245 (e.g., DDR4, PCIe) without going through the block I/O layer 221. The frontswap/cleancache API hooks 232 can directly initiate CPU memory copy and DMA transfer 263 to the interface controller 241 without going through the kernel driver module 231.

According to one embodiment, the system can provide interfaces to two or more overprovisioned memory devices 251, for example, one via a DDR4 interface and another via a PCIe interface. Different kernel driver modules 231 may be used for different types of the overprovisioned memory devices 251 and/or different interfaces to the same type of overprovisioned memory device 251.

According to one embodiment, the overprovisioned memory device 251 can increase the effective memory capacity of the system. The frontswap/cleancache API hooks 232 that provide memory access to the overprovisioned memory device 251 can provide orders of magnitude higher performance than virtual memory access to secondary swap devices such as an SSD and a HDD because the traditional slow I/O path via the block I/O layer 221 can be bypassed. Accesses to the overprovisioned memory device 251 are managed by the kernel driver module 231. Therefore, the system can use any interfaces (e.g., PCIe or DDR interface) that work with a specific overprovisioned memory device 251 without making modifications to the host OS kernel.

The implementation of the kernel driver module 231 for the overprovisioned memory device 251 requires configuration specific to the overprovisioned memory device 251. The kernel driver module 231 may need to be configured to manage the device interface 245 via a specific interface. For example, a PCIe implementation could have a related flow control, base address register (BAR) mapping, and memory initialization. The kernel driver module 231 allows the overprovisioned memory device 251 to have a variable overprovisioned capacity.

Due to the inline compression or deduplication, or error-correction of the data stored in the overprovisioned memory device, the overprovisioned memory device 251 can have a virtual memory capacity that varies during a runtime. For every page access to the overprovisioned memory device, the MMU of the host OS queries the kernel driver module 231 whether the page can be accepted via an API call. According to one embodiment, the kernel driver module 231 can communicate with a logic (e.g., the SoC 404 of FIG. 4) embedded in the overprovisioned memory device over the interface 245 to obtain a list of memory statistics, for example, the current overprovisioning ratio, and the available physical capacity. The kernel drive module 231 can use these statistics to accept or reject the query received from the host OS.

Figure 3:
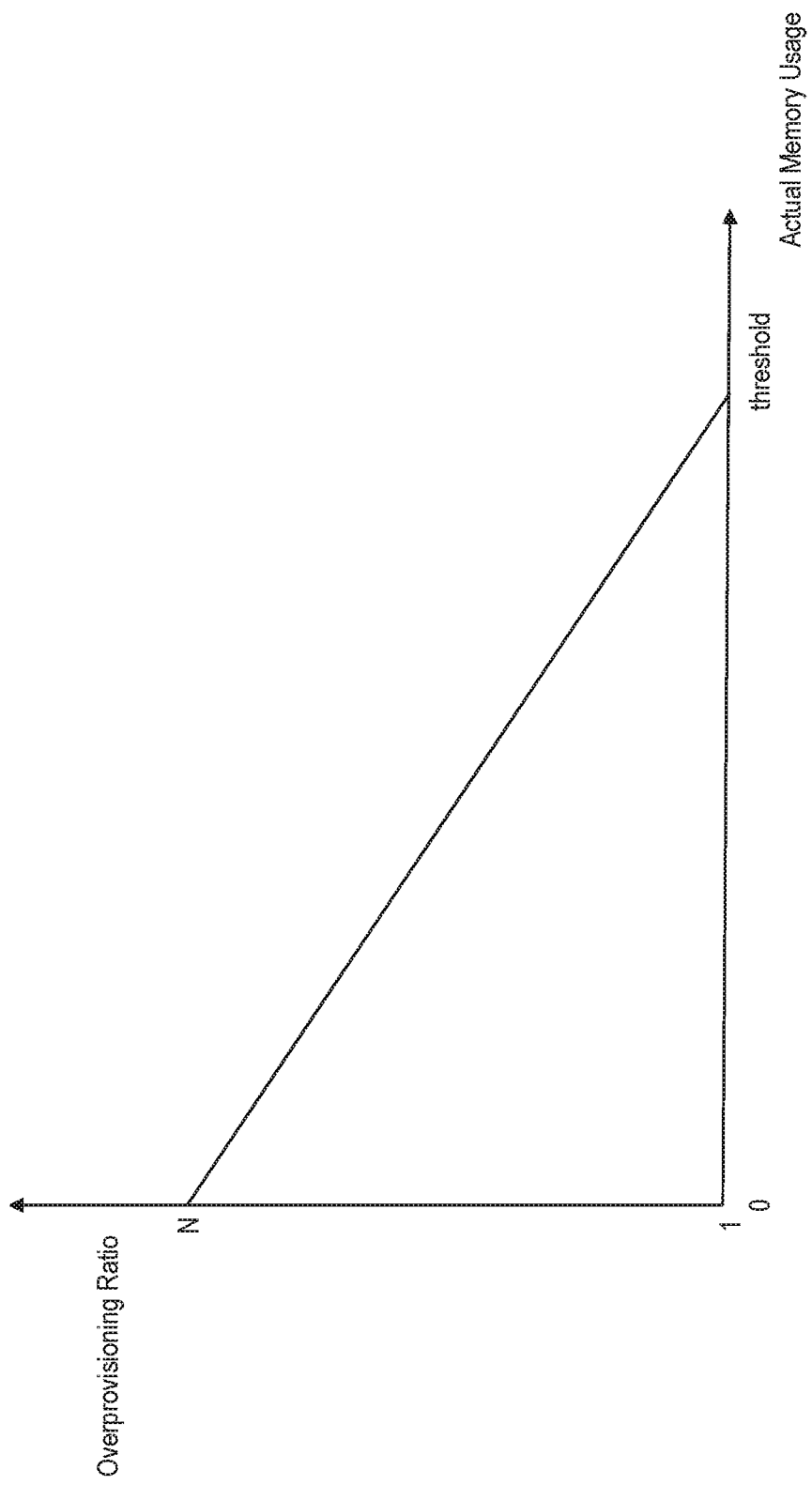
FIG. 3 illustrates an example function of compression/deduplication based system memory usage, according to one embodiment.

FIG. 3 illustrates an example function of compression/deduplication based system memory usage, according to one embodiment. As the memory occupancy increases, the embedded logic of the overprovisioned memory device in conjunction with the kernel driver module can reduce the overprovisioning ratio (down to 1) when the memory usage reaches a memory usage threshold value.

According to one embodiment, the embedded logic of the overprovisioned memory device includes an overprovisioning buffer. The overprovisioning buffer can handle excess data in an unforeseen situation where the kernel driver module cannot accept any page due to the insufficient capacity of the overprovisioned memory device. To avoid such a memory runaway situation, the kernel driver module can dynamically reduce the overprovisioning ratio by using a predefined function, for example, a linear function as shown in FIG. 3.

Figure 4:
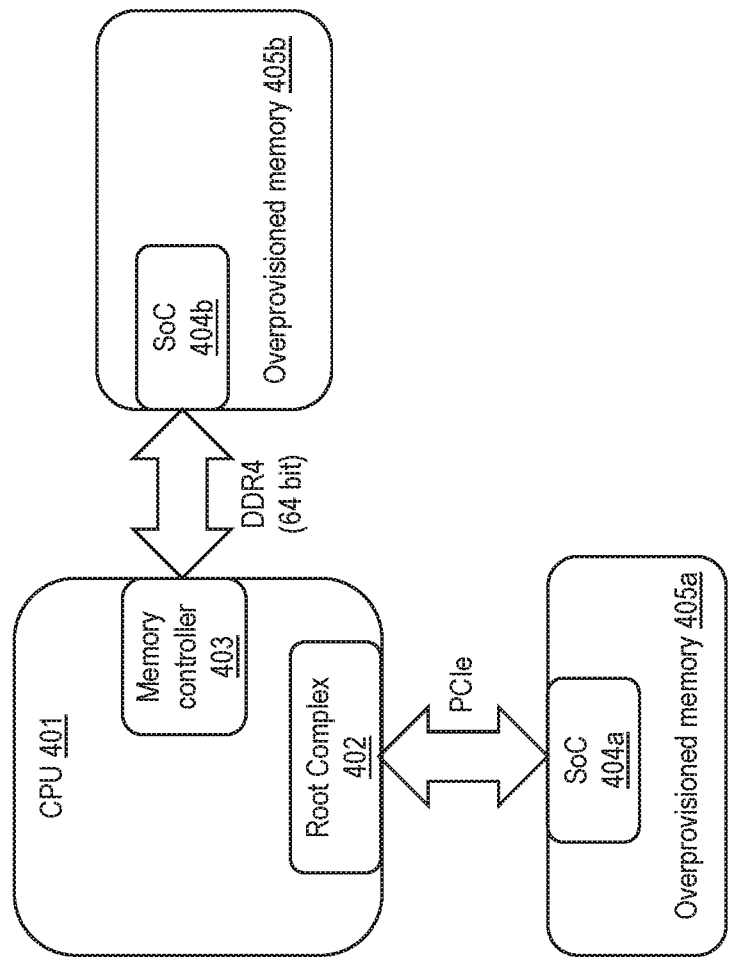
FIG. 4 shows a hardware stack of an example system including an overprovisioned memory device, according to one embodiment.

FIG. 4 shows a hardware stack of an example system including an overprovisioned memory device, according to one embodiment. The overprovisioned memory device (e.g., 405a and 405b) includes an embedded overprovisioning logic, herein also referred to as a system on chip (SoC) (e.g., 404a and 404b). Depending on the dataset stored in the overprovisioned memory device, the efficiency of the inline compression and/or deduplication can change. The SoC embedded in the overprovisioned memory device can implement an overprovisioning algorithm to provide a dynamically varying virtual memory capacity.

According to some embodiments, the overprovisioned memory device can be placed within the system on a variety of interfaces including, but not limited to, DDR and PCIe interfaces. In the present example, the overprovisioned memory device 405a is placed on a PCIe bus, and the overprovisioned memory device 405b is placed on a 64 bit DDR4 memory bus. Upon booting, the BIOS of the host system registers the overprovisioned memory devices 405a and 405b as a DRAM memory or a block device similar to an SSD or a HDD on a specified interface. The overprovisioned memory device can advertise its virtual memory capacity larger than its physical capacity. The BIOS registers the overprovisioned virtual memory capacity of the overprovisioned memory device. For synchronous interfaces such as the DDR4 interface, a special training sequence may be required in addition to disabling address interleaving with the system memory.

During a runtime, instructions of the CPU 401 to load data from and store data to the overprovisioned memory device 405 can run as unmodified. This is because the overprovisioned memory device is a part of the system's virtual memory but does not appear as a paged memory like an SSD or HDD. Although marked as a swap device, the overprovisioned memory device is backed by the secondary swap of the system because the overprovisioned memory device can provide a "best-effort" service. The kernel driver module can accept or reject pages on a page basis by accounting for the available capacity and the hardware state of the overprovisioned memory device. Upon a page fault for load/store in the CPU 401, the page fault handler (e.g., swap handler 214 of FIG. 2) of the host OS kernel can automatically invoke a fast swap via the frontswap/cleancache API call. If the access is not successful, the page access proceeds to a regular system swap to a swap system such as an SSD or a HDD.

DMA transactions to the overprovisioned memory device 405 can work in a standard manner. This is because all the accesses to the overprovisioned memory device 405 are serialized at the page fault handler, and the DMA transaction region is not CPU-cached. Therefore, data movements either from the physical system memory to the overprovisioned memory device 405 or vice-verse do not need additional cache invalidations.

Figure 5:
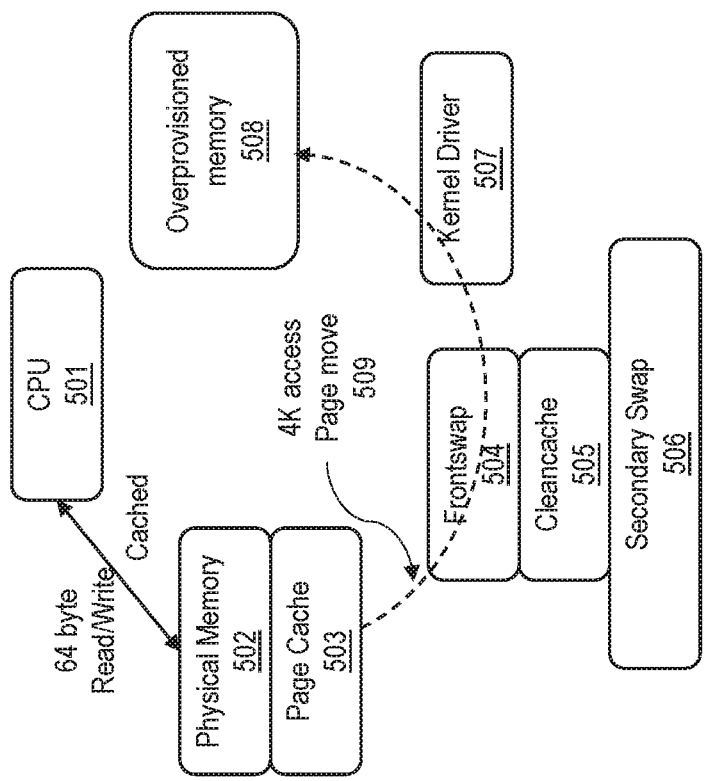
FIG. 5 shows a software stack of an example system including an overprovisioned memory device, according to one embodiment.
Figure 6:
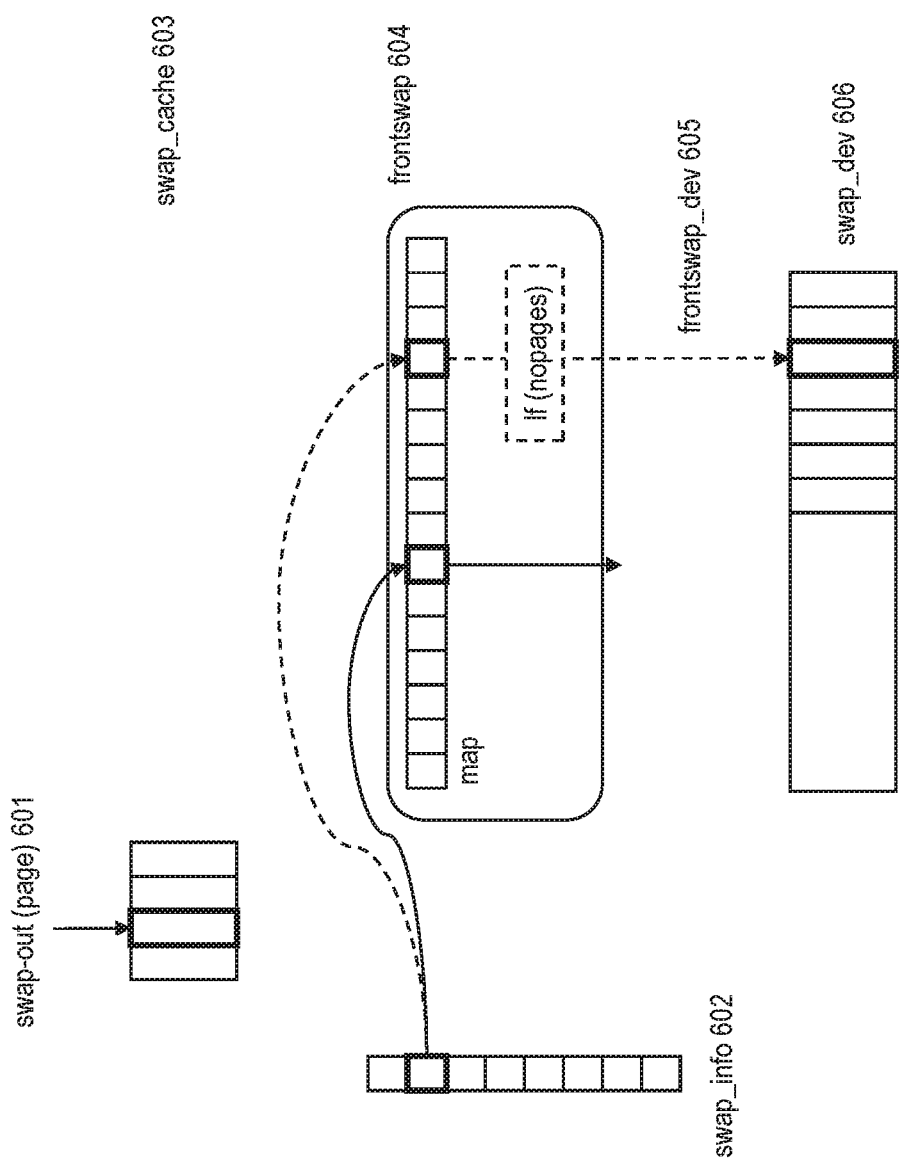
FIG. 6 shows an example frontswap operation in the presence of a normal swap device, according to one embodiment.

FIG. 5 shows a software stack of an example system including an overprovisioned memory device, according to one embodiment. FIG. 6 shows an example frontswap operation in the presence of a normal swap device, according to one embodiment. Although various host OSes can implement a fast swap operation, the present example shows the functions and API calls of Linux OS.

Referring to FIG. 6, if a page swap-out request is issued, the frontswap/cleancache API puts the pages on a swap cache 601. The frontswap/cleancache API searches swap_info structure (602) to find an empty, invalidate page in the frontswap device 605. If an empty page is found on the front swap device 605, the page swap-out request is completed. If an invalidate page is found on frontswap device 605, the frontswap/cleancache API makes the invalidate page clean and sets it as an empty page. If no empty pages are found, the frontswap/cleancache API searches a map table corresponding to a secondary swap device 606. If there is no available page in the entire swap space, the frontswap/cleancache API determines that the page swap-out request is failed.

During a boot time, the kernel driver module 507 registers the overprovisioned memory device 508 as a block memory device. In addition, the kernel driver module 507 registers the frontswap API function 504 and the cleancache API function 505 using the register_ops call. The registration of the frontswap 504 and the cleancache 505 can be specific to the topology of the overprovisioned memory device 508 and the interface (e.g., DDR4 or PCIe). The frontswap API function 504 and the cleancache API function 505 can respectively facilitate the placement of anonymous and non-anonymous pages in the overprovisioned memory device 508 by avoiding a block I/O layer. Therefore, the frontswap API function 504 and the cleancache API function 505 can provide the high performance fast swap for the physical system memory (e.g., DRAM) or other memory technology-based systems.

Various functionalities of the kernel driver module 507 can be implemented during the initialization. Examples of the functionalities of the kernel driver module 507 include, but are not limited to, 1) an interface-specific configuration (e.g., DDR4 and PCIe), an interface flow control, a direct memory access (DMA) initialization, 2) an overprovisioning algorithm initialization (e.g., algorithm parameters and internal memory region allocations), 3) a garbage collection handshake, 4) an internal cache/memory controller, and Reliability, Availability, Serviceability (RAS) policies (e.g., ECC protection), and 5) a device power management policy.

Referring to FIG. 5, the system is provisioned with a reliable secondary swap device 506. The capacity of the secondary swap device 506 may be larger than or equal to the overprovisioned memory device 508. The secondary swap device 506 can safely accept pages when the overprovisioned memory device 508 is full due to a data compaction ratio of the memory device. The data compaction ratio of the memory device may represent as a whole a data compression ratio, a data deduplication ratio, and/or error-corrected bit ratio of the memory device. Moreover, a bitmap is constructed to quickly identify whether pages are located in the overprovisioned memory device 508, a secondary swap space, or a file system. The MMU of the host OS manages the secondary swap device 506 using a swap_info structure (e.g., swap_info 602 shown in FIG. 6). In one embodiment, the size of each entry for a block in the swap_info structure is 8 bits. The page tracking by the swap_info structure can hold an additional bit for each page. The MMU completes the memory allocation process by invoking swapon syscall.

Referring to FIGS. 5 and 6, the kernel driver module 507 can implement the read, write, and invalidate functions to interact with the page fault handler (e.g., swap handler 214 of FIG. 2) of the host kernel OS as it accesses the frontswap function call 504 or the cleancache function call 505. The page fault handler moves the 4K pages along the curved line 509 from physical memory 502. According to one embodiment, the read, write, and invalidate functions are invoked by the CPU 501 during a runtime for each page request. For instance, the kernel driver module 507 checks whether the frontswap function call 504 is enabled or not using swap_writepage. If enabled, the swap_writepage function tries to swap-out a page 601 with frontswap device 604 to the overprovisioned memory device 508 while following the standard swap management procedures. For example, a victim page is checked against the swap cache 603 to eliminate unnecessary migration of clean pages. Then, swap_map inside the kernel swap_info 602 is looked up for an empty slot to guarantee that the page's references can be counted. Finally, the reference for the page from the process page table is removed after the page is copied to the frontswap device 604.

The size of the frontswap-map table covers the entire swap space including the total pages on the frontswap device 604 and the secondary swap device(s). From the point of view of the swap front-end, these multiple swap devices are regarded as one-dimensional single array. The bitmap indicates that a target page is in the frontswap device or the secondary swap device 506. Page allocation for swap-out should be done at the frontswap device 605 first. If it has no page, swap front-end searches available pages on the secondary swap device 606.

According to one embodiment, the kernel driver module 507 can manage a dynamically variable capacity as it handles each swap request. To implement this, the kernel driver module 507 can establish a feedback channel with the SoC of the overprovisioned memory device 508 to obtain the status of the overprovisioned memory device 508 including, but not limited to, an overprovisioning ratio, current memory capacity, buffer sizes, and safety thresholds upon write request. The kernel driver module 507 or the SoC can decide whether the capacity of the overprovisioned memory device 508 is sufficient or not to accept the page requests. The frontswap and cleancache API hooks provide an ability to reject the page, for example, if the current overprovisioning ratio and physical capacity indicate that there would be insufficient logical capacity to store an additional page safely. Instead, the MMU swap handler can automatically write to a secondary swap region of the secondary swap device 506 or the filesystem of an SSD (or HDD).

As discussed earlier, the present overprovisioned memory device can be efficiently integrated into an existing memory system without making extensive kernel modifications. The overprovisioned memory device can provide a dynamically variable memory density while providing a high system performance on different system interfaces. A kernel driver module loaded in the kernel space of the host OS is coupled with the SoC embedded in the overprovisioned memory device to update the overprovisioning parameters of the overprovisioned memory device. The overprovisioned memory device integrated as such can be efficiently deployed and managed to provide hardware-based memory augmentation by compression, deduplication, error correction on different system interfaces. The kernel driver module and the SoC of the overprovisioned memory device can communicate with each other, for example, on a dedicated communication channel to update a physical memory usage in order to manage the variable memory overprovisioning of the overprovisioned memory device.

In some embodiments, an overprovisioning logic that determines an advertised overprovisioning ratio and the available physical capacity of the overprovisioned memory device is embedded within the SoC of the overprovisioned memory device. The SoC communicates with the kernel driver module directly to report the overprovisioning parameters. In this case, the kernel driver module may merely determine to accept or reject pages based on the obtained overprovisioning parameters. Alternatively, the kernel drive module could take raw data from the SoC and do more complex computations on capability itself.

According to one embodiment, a memory device includes a memory interface to a host computer and a memory overprovisioning logic configured to provide a virtual memory capacity to a host operating system (OS). A kernel driver module of the host OS is configured to manage the virtual memory capacity of the memory device provided by the memory overprovisioning logic of the memory device and provide a fast swap of the anonymous pages to a frontswap space and file pages to a cleancache space of the memory device based on the virtual memory capacity of the memory device.

The virtual memory capacity of the memory device dynamically may vary by compression, deduplication, or/and error-correction of data stored in the memory device.

The memory interface may be a double data rate (DDR) interface or a peripheral component interconnect express (PCIe) interface.

The kernel driver module may provide a frontswap application programming interface (API) call and a cleancache API call.

The frontswap API call of the kernel driver module may provide a hook to intercept anonymous pages before the anonymous pages are migrated to a swap space of a secondary swap system, and may migrate the anonymous pages to the frontswap space of the memory space.

The frontswap API call of the kernel driver module may migrate the anonymous pages to a swap space of the secondary swap system provided the virtual memory capacity is full due to a compaction ratio of the memory device.

The cleancache API call of the kernel driver module may provide a hook to intercept file pages before the file pages are migrated to a file system of a secondary swap system, and may migrate the file pages to the cleancache space of the memory device.

The cleancache API call of the kernel driver module may migrate the file pages to a file system of the secondary swap system provided the virtual memory capacity of is full due to a compaction ratio of the memory device.

The frontswap and cleancache API calls may initiate a CPU memory copy and direct memory access (DMA) transfer to an interface controller.

The memory overprovisioning logic may include an embedded bitmap to tracks pages in the memory device.

The memory device of claim 1 may further include a dedicated communication channel to provide the virtual memory capacity to the host OS.

According to another embodiment, a method includes: providing a memory device comprising including a memory overprovisioning logic configured to provide a virtual memory capacity to a host operating system (OS); configuring the memory device as a block memory device over a memory interface to a host computer; loading a kernel driver module from a kernel of the host OS during a runtime; and providing a fast swap of the anonymous pages to a frontswap space and file pages to a cleancache space of the memory device using the kernel driver module based on the virtual memory capacity of the memory device.

The method may further include registering the memory device as a block memory device having the virtual memory capacity.

The kernel driver module may determine to accept or reject the anonymous pages or the file pages based on the virtual memory capacity.

The virtual memory capacity of the memory device may dynamically vary by compression, deduplication, or/and error-correction of data stored in the memory device.

The memory interface may be a double data rate (DDR) interface or a peripheral component interconnect express (PCIe) interface.

The kernel driver module may provide a frontswap application programming interface (API) call and a cleancache API call. The frontswap API call of the kernel driver module may provide a hook to intercept anonymous pages before the anonymous pages are migrated to a swap space of a secondary swap system, and may migrate the anonymous pages to the frontswap space of the memory space. The cleancache API call of the kernel driver module may provide a hook to intercept file pages before the file pages are migrated to a file system of a secondary swap system, and may migrate the file pages to the cleancache space of the memory device.

The frontswap API call of the kernel driver module may migrate the anonymous pages to a swap space of the secondary swap system, and the cleancache API call of the kernel driver module may migrate the file pages to a file system of the secondary swap system provided the virtual memory capacity is full due to a compaction ratio of the memory device.

The frontswap and cleancache API calls may initiate a CPU memory copy and direct memory access (DMA) transfer to an interface controller.

The memory overprovisioning logic may include an embedded bitmap to tracks pages in the memory device.

The above example embodiments have been described hereinabove to illustrate various embodiments of implementing a system and method for integrating overprovisioned memory devices. Various modifications and departures from the disclosed example embodiments will occur to those having ordinary skill in the art. The subject matter that is intended to be within the scope of the invention is set forth in the following claims.

What is claimed is:

1. A memory device comprising:
a memory interface to a host computer; and
a memory overprovisioning logic configured to provide a virtual memory capacity to a host operating system (OS),
wherein a kernel driver module of the host OS is configured to manage the virtual memory capacity of the memory device provided by the memory overprovisioning logic of the memory device and provide a fast swap of anonymous pages to a frontswap space and file pages to a cleancache space of the memory device based on the virtual memory capacity of the memory device,
wherein the kernel driver module provides a frontswap application programming interface (API) call and a cleancache API call, and
wherein the frontswap API call of the kernel driver module provides a hook to intercept the anonymous pages before the anonymous pages are migrated to a swap space of a secondary swap system, and instead migrates the anonymous pages to the frontswap space of the memory space.

2. The memory device of claim 1, where the virtual memory capacity of the memory device dynamically varies by compression, deduplication, or/and error-correction of data stored in the memory device.

3. The memory device of claim 1, wherein the memory interface is a double data rate (DDR) interface or a peripheral component interconnect express (PCIe) interface.

4. The memory device of claim 1, wherein the frontswap API call of the kernel driver module migrates the anonymous pages to the swap space of the secondary swap system when the virtual memory capacity is full due to a compaction of the memory device.

5. A memory device comprising:
a memory interface to a host computer; and
a memory overprovisioning logic configured to provide a virtual memory capacity to a host operating system (OS),
wherein a kernel driver module of the host OS is configured to manage the virtual memory capacity of the memory device provided by the memory overprovisioning logic of the memory device and provide a fast swap of anonymous pages to a frontswap space and file pages to a cleancache space of the memory device based on the virtual memory capacity of the memory device,
wherein the kernel driver module provides a frontswap application programming interface (API) call and a cleancache API call, and
wherein the cleancache API call of the kernel driver module provides a hook to intercept the file pages before the file pages are migrated to a file system of a secondary swap system, and instead migrates the file pages to the cleancache space of the memory device.

6. The memory device of claim 5, wherein the cleancache API call of the kernel driver module migrates the file pages to the file system of the secondary swap system when the virtual memory capacity is full due to a compaction ratio of the memory device.

7. The memory device of claim 1, wherein the frontswap and cleancache API calls initiate a CPU memory copy and direct memory access (DMA) transfer to an interface controller.

8. The memory device of claim 1, wherein the memory overprovisioning logic includes an embedded bitmap to tracks pages in the memory device.

9. The memory device of claim 1, further comprising a dedicated communication channel to provide the virtual memory capacity to the host OS.

10. A method comprising:
providing a memory device comprising a memory overprovisioning logic configured to provide a virtual memory capacity to a host operating system (OS);
configuring the memory device as a block memory device over a memory interface to a host computer;
loading a kernel driver module from a kernel of the host OS during a runtime; and
providing a fast swap of anonymous pages to a frontswap space and file pages to a cleancache space of the memory device using the kernel driver module based on the virtual memory capacity of the memory device,
wherein the kernel driver module provides a frontswap application programming interface (API) call and a cleancache API call, wherein the frontswap API call of the kernel driver module provides a hook to intercept the anonymous pages before the anonymous pages are migrated to a swap space of a secondary swap system, and instead migrates the anonymous pages to the frontswap space of the memory space, and wherein the cleancache API call of the kernel driver module provides a hook to intercept the file pages before the file pages are migrated to a file system of the secondary swap system, and instead migrates the file pages to the cleancache space of the memory device.

11. The method of claim 10, further comprising registering the memory device as a block memory device having the virtual memory capacity.

12. The method of claim 10, wherein the kernel driver module determines to accept or reject the anonymous pages or the file pages based on the virtual memory capacity.

13. The method of claim 10, where the virtual memory capacity of the memory device dynamically varies by compression, deduplication, or/and error-correction of data stored in the memory device.

14. The method of claim 10, wherein the memory interface is a double data rate (DDR) interface or a peripheral component interconnect express (PCIe) interface.

15. The method of claim 10, wherein the frontswap API call of the kernel driver module migrates the anonymous pages to the swap space of the secondary swap system and the cleancache API call of the kernel driver module migrates the file pages to the file system of the secondary swap system when the virtual memory capacity is full due to a compaction ratio of the memory device.

16. The method of claim 10, wherein the frontswap and cleancache API calls initiate a CPU memory copy and direct memory access (DMA) transfer to an interface controller.

17. The method of claim 10, wherein the memory overprovisioning logic includes an embedded bitmap to tracks pages in the memory device.

* * * * *